(12) United States Patent
Picard

(10) Patent No.: US 10,146,306 B2
(45) Date of Patent: Dec. 4, 2018

(54) GAZE POSITION DETECTION APPARATUS AND GAZE POSITION DETECTION METHOD

(71) Applicant: FUJITSU LIMITED, Kawasaki-shi, Kanagawa (JP)

(72) Inventor: Sébastien Picard, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/591,756

(22) Filed: May 10, 2017

(65) Prior Publication Data

US 2017/0351329 A1 Dec. 7, 2017

(30) Foreign Application Priority Data

Jun. 6, 2016 (JP) .................. 2016-112605

(51) Int. Cl.
*G06F 3/01* (2006.01)
*G06K 9/00* (2006.01)

(52) U.S. Cl.
CPC ........... *G06F 3/013* (2013.01); *G06K 9/0061* (2013.01)

(58) Field of Classification Search
CPC .............................. G06F 3/013; G06K 9/0061
See application file for complete search history.

(56) References Cited

U.S. PATENT DOCUMENTS

| 2002/0106135 | A1 | 8/2002 | Iwane |
| 2010/0010370 | A1 | 1/2010 | De Lemos et al. |
| 2011/0310006 | A1 | 12/2011 | Edwards et al. |
| 2013/0002551 | A1 | 1/2013 | Imoto et al. |
| 2014/0226131 | A1* | 8/2014 | Lopez ................... G06F 1/1626 351/210 |
| 2016/0029883 | A1* | 2/2016 | Cox ....................... G06F 3/013 351/209 |
| 2016/0066782 | A1 | 3/2016 | Kimura et al. |

FOREIGN PATENT DOCUMENTS

| WO | 2002/01505 | 1/2002 |
| WO | 2010/071928 | 7/2010 |
| WO | 2011/158511 | 12/2011 |
| WO | 2015/136908 | 9/2015 |

* cited by examiner

*Primary Examiner* — Chun-Nan Lin
(74) *Attorney, Agent, or Firm* — Fujitsu Patent Center

(57) ABSTRACT

A gaze position detection apparatus includes: a memory which stores a plurality of registered move patterns of a gaze position and correction information of the gaze position included in the registered move pattern for each of the registered move patterns; a move pattern detection unit which detects a move pattern of a user's gaze position, from a plurality of measurement points of the user's gaze position which are obtained from data items representing a user's gaze direction generated by a gaze detection device in different timing; a similar-pattern extraction unit which extracts the registered move pattern similar to the move pattern of the user's gaze position from among the plurality of registered move patterns; and a correction unit which corrects the gaze position included in the move pattern of the user's gaze position using the correction information of the gaze position for the similar registered move pattern.

15 Claims, 7 Drawing Sheets

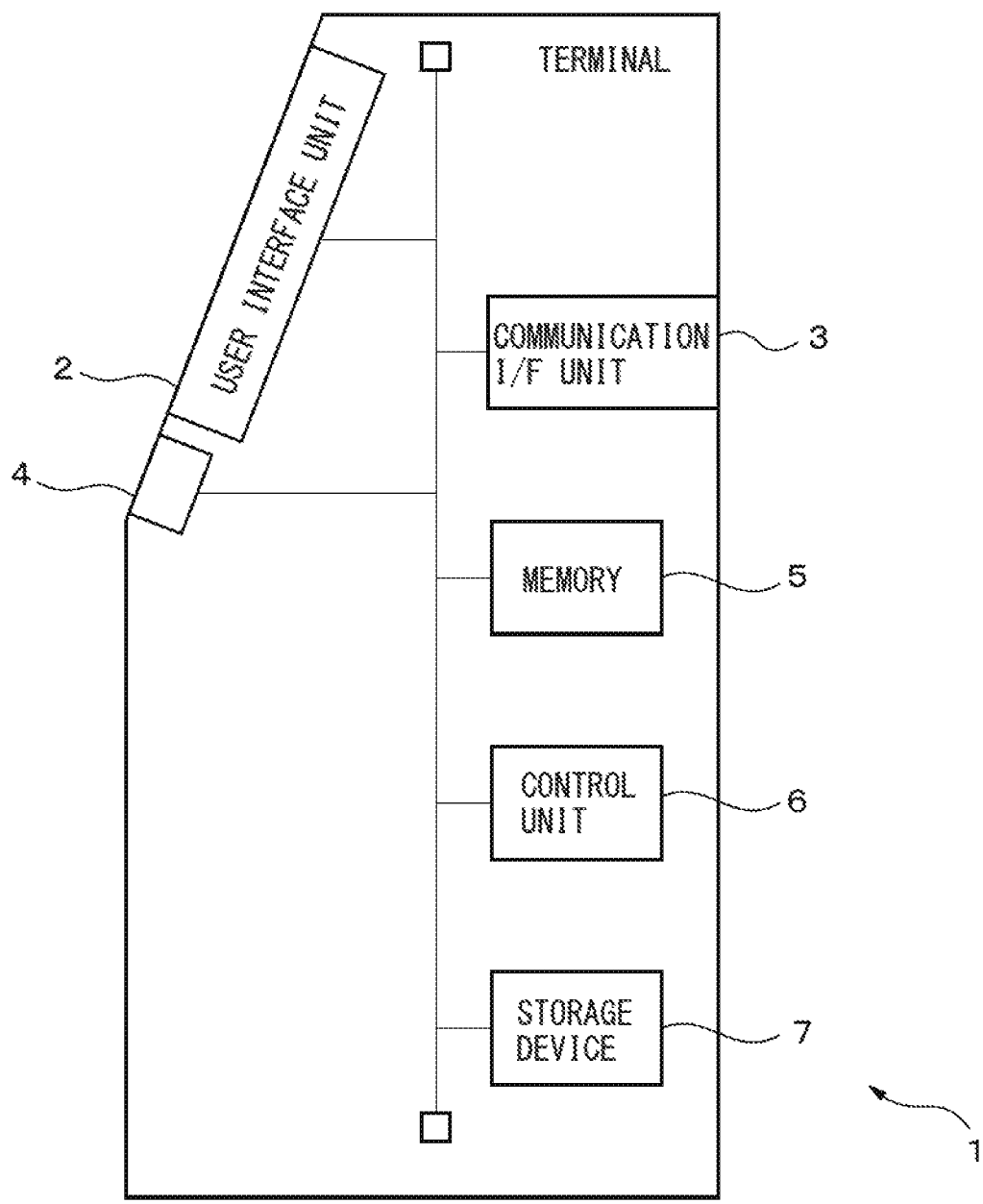

FIG. 5

| USER ID | SEQUENCE NUMBER | GAZE POINT COORDINATES | CORRECTION VECTOR | FEATURE FOR SELECTION | CALIBRATION MAP |
|---|---|---|---|---|---|
| 00000001 | 1, | $x_1,y_1, x_2,y_2,...,x_{n1},y_{n1}$ | $dx_1,dy_1, ... dx_{n1}, dy_{n1}$ | $f_{1,1} .... f_{1,m}$<br>....<br>$f_{n1,1} ... f_{n1,m}$ | $Offset_1(x,y,dx,dy)$ |
| | ... | | | | |
| | K1 | | | | |
| ... | 1 | $x_1,y_1, x_2,y_2,...,x_n,y_n$ | $dx_1,dy_1, ... dx_n, dy_n$ | $f_{1,1} .... f_{1,m}$<br>....<br>$f_{n,1} ... f_{n,m}$ | $Offset_N(x,y,dx,dy)$ |
| | ... | | | | |
| NNNNNNNN | $K_N$ | | | | |

501　　502　　503　　504　　505　　506

500

GAZE POSITION DETECTION APPARATUS AND GAZE POSITION DETECTION METHOD

CROSS-REFERENCE TO RELATED APPLICATION

This application is based upon and claims the benefit of priority of the prior Japanese Patent Application No. 2016-112605, filed on Jun. 6, 2016, and the entire contents of which are incorporated herein by reference.

FIELD

The present invention relates to, for example, a gaze position detection apparatus, a gaze position detection method, and a computer program for detecting a gaze position which detect a gaze position of a user on the basis of an image including a captured user's eye.

BACKGROUND

In recent years, devices capable of detecting a gaze direction of a user on the basis of an image including a captured user's eye is miniaturized. Therefore, such devices capable of detecting a gaze direction of a user can be mounted in various apparatuses. Then, applications utilizing the result of a gaze detection of a user with such a device has been studied (e.g., refer to International Patent publication No. 2011-158511).

For example, an instruction input device described in International Patent publication No. 2011-158511 detects a first direction in which a user looks and a second direction in which the user performs a pointing operation. The instruction input device calculates a gaze position of the user on a screen on the basis of a position of the user and the first direction, and calculates a reference line in the space, the reference line corresponding to the gaze position and connecting the user and the screen. The instruction input device calculates a distance, in a second direction, between input coordinates indicating a position of a user's hand and the reference line, as an offset amount corresponding to the gaze position. The instruction input device then calculates a position at which a distance from the gaze position in a first screen specifying direction is the offset amount on the screen, as a pointer display position. The instruction input device combines a three-dimensional direction of a face and a direction of an iris of the eye in the face to detect a gaze direction in real space, and set the gaze direction as the first direction.

The instruction input device is based on a premise that a user's gaze direction can be detected accurately. However, in general, a true gaze direction deviates from a measured gaze direction per se, i.e., unprocessed gaze direction, and from this reason, it is difficult to detect the user's gaze direction accurately when the unprocessed gaze direction data is used as it is. In view of this, so-called calibration processing is performed in advance in order to detect the user's gaze direction accurately.

However, in some cases, positional relationship between a device for gaze detection and a user at the time of detecting the gaze may differ from positional relationship between the device for gaze detection and the user at the time of executing the calibration processing. Different positional relationship between the user and the device results in different gaze positions on a screen of an apparatus even when gaze directions are the same. In addition, it is complicated for a user to perform the calibration processing each time, and it is not practical.

On the other hand, an algorithm for automatically performing calibration in a gaze direction according to a user's action is proposed (e.g., refer to International Patent publication No. 2010-071928). The algorithm disclosed in International Patent publication No. 2010-071928 monitors a user's gaze direction during execution of a series of tasks in which a user is assumed to gaze an object, for example, execution of an action of selecting or clicking small areas on a computer screen. The algorithm obtains a correlation between a direction assumed and a user's gaze direction, and calculates a parameter of the gaze direction to be used for the user from the correlation.

A gaze detecting device is proposed which generates gaze-direction distribution for each head posture with respect to a person to be measured, and corrects the gaze-direction distribution with respect to a head posture other than a reference position using a calibration parameter for calibrating the gaze-direction distribution with respect to the reference position (e.g., refer to International Patent publication No. 2015-136908).

SUMMARY

However, the algorithm disclosed in International Patent publication No. 2010-071928 is based on a premise that a task associating the gaze direction assumed with a user's operation is performed. Therefore, the algorithm may not be applied when such task is not performed. In addition, the gaze detecting device disclosed in International Patent publication No. 2015-136908 may not correct a detection error in the gaze direction due to a factor other than the head posture, for example, due to a size of the eyeball.

According to one exemplary embodiment, a gaze position detection apparatus is provided. The gaze position detection apparatus includes: a storage unit which stores a plurality of registered move patterns of a gaze position and correction information of the gaze position included in the registered move pattern for each of the plurality of registered move patterns; a move pattern detection unit which detects a move pattern of a user's gaze position, from a plurality of measurement points of the user's gaze position which are obtained from data items representing a user's gaze direction generated by a gaze detection device in different timing; a similar-pattern extraction unit which extracts the registered move pattern similar to the move pattern of the user's gaze position from among the plurality of registered move patterns; and a correction unit which corrects the gaze position included in the move pattern of the user's gaze position using the correction information of the gaze position correction information for the similar registered move pattern.

Effect of the Invention

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a configuration diagram of hardware of a terminal in which a gaze position detection apparatus according to an embodiment is mounted.

FIG. 5 is a diagram illustrating an example of a move pattern database.

DESCRIPTION OF EMBODIMENTS

Figure 2A:
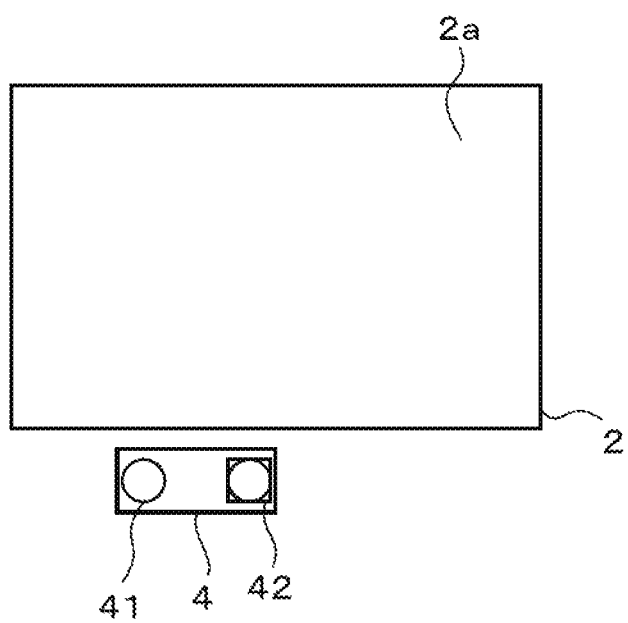
FIG. 2A is a diagram illustrating an example of an arrangement of a user interface unit and a gaze detection device viewed from front of the terminal.

A gaze position detection apparatus is described below with reference to the drawings. This gaze position detection apparatus corrects user's gaze positions by the use of a move pattern database in which a huge amount of data about move patterns of gaze positions of various people obtained under various conditions and gaze position correction information. Specifically, the gaze position detection apparatus detects a move pattern of user's gaze positions at relatively short intervals. The gaze position detection apparatus then extracts a gaze position move pattern similar to the detected move pattern, from the move pattern database, and corrects the user's gaze positions by the use of gaze position correction information defined for the extracted move pattern.

In the present embodiment, the gaze position detection apparatus is implemented in a stationary terminal, such as a kiosk terminal, an automated teller machine (ATM), an electronic information board, a digital signage, or a desktop computer. However, this gaze position detection apparatus may be implemented in a mobile terminal, such as a mobile phone, a smartphone, or a tablet, or may be implemented in a device such as a vehicle-mounted drive assist device, a projector, or an eyeglass-type head-mounted display.

FIG. 1 is a configuration diagram of hardware of a terminal in which a gaze position detection apparatus according to an embodiment is implemented. A terminal 1 includes a user interface unit 2, a communication interface unit 3, a gaze detection device 4, a memory 5, a control unit 6, and a storage device 7. Note that FIG. 1 is a diagram for illustrating the components included in the terminal 1 and is not a diagram representing an actual arrangement of the components of the terminal 1.

The user interface unit 2 includes, for example, a touch panel display. The user interface unit 2 is disposed so that an operation screen of the user interface unit 2 faces a user facing front of the terminal 1. The user interface unit 2 displays, for example, text, images, icons, or operation buttons on the operation screen according to a control signal from the control unit 6. The operation screen of the user interface unit 2 is an example of a target surface at which the user is to gaze. When a user touches the position of a displayed icon or operation button, the user interface unit 2 generates an operation signal corresponding to the position and outputs the operation signal to the control unit 6.

The communication interface unit 3 includes a communication circuit for connecting the terminal 1 to a communication network (not illustrated). The communication interface unit 3 receives a signal, for example, from a different device, such as a server (not illustrated) connected via the communication network and transfers the signal to the control unit 6. The communication interface unit 3 receives a signal to the different device from the control unit 6 and outputs the signal to the communication network.

The gaze detection device 4 is disposed near the user interface unit 2 and generates measurement data indicating a gaze direction of the user at predetermined intervals (e.g., one millisecond to 33 milliseconds). The gaze detection device 4 then outputs the generated measurement data to the control unit 6.

For example, the gaze detection device 4 includes an infrared-emitting diode and an infrared camera including an image sensor having sensitivity to infrared rays, such as a charge-coupled device (CCD) or a complementary metal oxide semiconductor (C-MOS), and an optical imaging system. The gaze detection device 4 generates, as measurement data, an image including a pupil of the user and a corneal-reflex image based on rays emitted by the infrared-emitting diode and reflected at the cornea (referred to as a Purkinje image below).

Figure 2B:
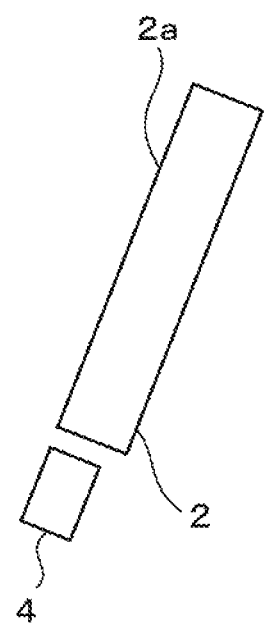
FIG. 2B is a diagram illustrating an example of the arrangement of the user interface unit and the gaze detection device viewed from side of the terminal.

FIG. 2A is a diagram illustrating an example of an arrangement of the user interface unit 2 and the gaze detection device 4 viewed from the front of the terminal 1, and FIG. 2B is a diagram illustrating an example of the arrangement of the user interface unit 2 and the gaze detection device 4 viewed from side of the terminal 1. In this embodiment, the gaze detection device 4 is disposed below the user interface unit 2 so as to face the user facing an operation screen 2a of the user interface unit 2. An infrared-emitting diode 41 of the gaze detection device 4 illuminates the eyes of the user. Then, a camera 42 of the gaze detection device 4 generates an image of the entire face or part of the face of the user including at least one of the eyes of the user looking at the operation screen 2a of the user interface unit 2.

The memory 5 is an example of a storage unit and includes, for example, a readable/writable nonvolatile semiconductor memory. The memory 5 stores various application programs to be run on the control unit 6 and various kinds of data.

The memory 5 also stores various kinds of data to be used for detecting user's gaze positions. For example, the memory 5 stores a reference table representing the relationship between the relative position of a pupil center with respect to a center of a corresponding Purkinje image (i.e. corneal reflection center) and a user's gaze direction, and a reference table representing the relationship between a gaze direction and a gaze position. The memory 5 also stores the position, the horizontal and vertical sizes, and the like of each of icons and operation buttons displayed on the operation screen of the user interface unit 2. The memory 5 further stores each image of an eye(s) of the user obtained by the gaze detection device 4, or the coordinates, an acquisition order, and the like of a measurement point of a raw gaze position before calibration detected on the basis of the image.

The control unit 6 includes one or multiple processors and peripheral circuits thereof. The control unit 6 is connected to each of the units of the terminal 1 via a signal line and is configured to control the entire terminal 1. For example, the control unit 6 carries out a process corresponding to an operation signal received from the user interface unit 2 and a running application program.

The control unit 6 also functions as a gaze position detection apparatus.

The storage device 7 is another example of a storage unit and includes, for example, a hard disk device, or an optical recording medium and an access unit therefor. The storage device 7 stores a database of gaze position move patterns. The details of the move pattern database are to be described later.

Figure 3:
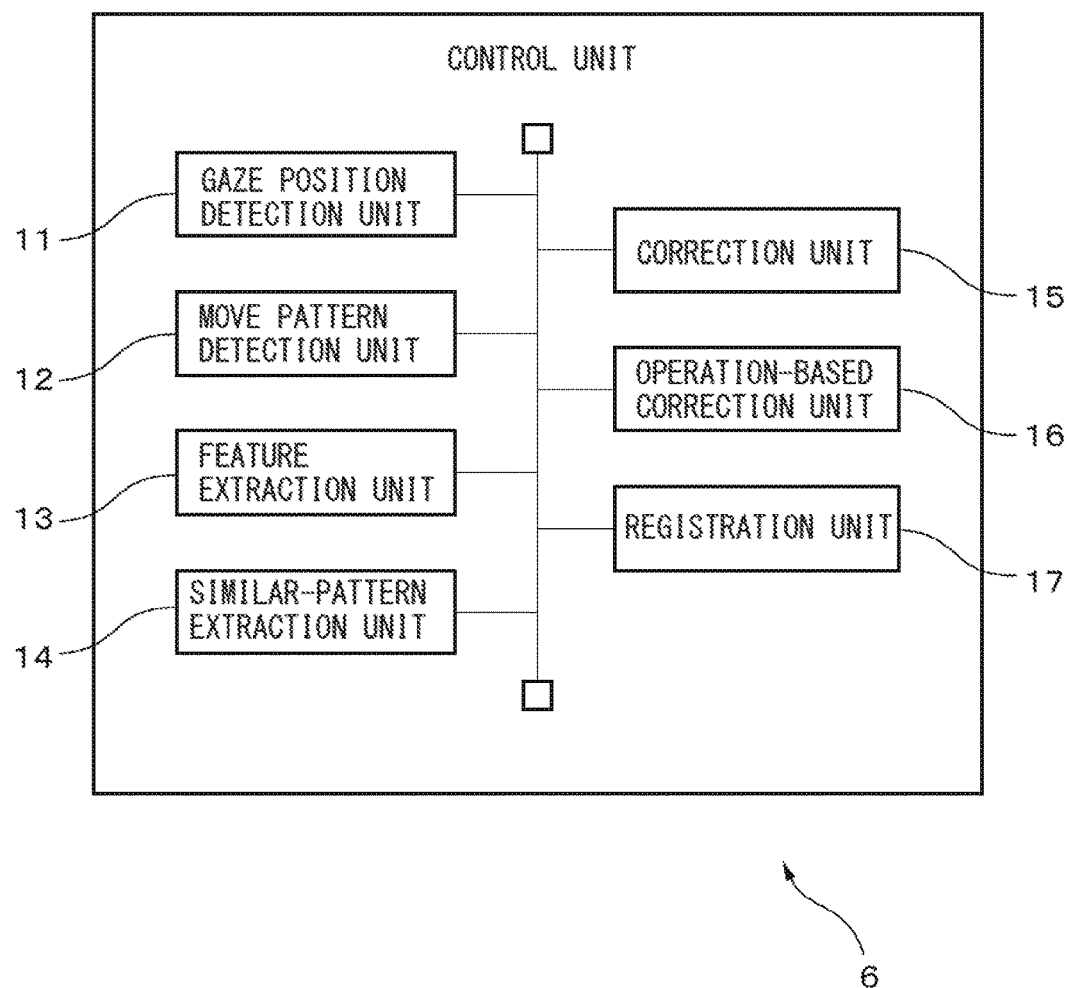
FIG. 3 is a functional block diagram related to a gaze position detection process by a control unit.

FIG. 3 is a functional block diagram related to a gaze position detection process by the control unit 6. The control unit 6 includes a gaze position detection unit 11, a move pattern detection unit 12, a feature extraction unit 13, a similar-pattern extraction unit 14, a correction unit 15, an operation-based correction unit 16, and a registration unit 17.

The units included in the control unit 6 are functional modules implemented by a computer program executed on a processor included in the control unit 6. The units included in the control unit 6 may be formed as a circuit separately from the processor of the control unit 6. Alternatively, the units included in the control unit 6 may be implemented in the terminal 1 as one or multiple integrated circuit in which circuits corresponding to the units are integrated, separately from the processor of the control unit 6.

Every time the control unit 6 acquires an image from the gaze detection device 4, the gaze position detection unit 11 detects each area including a user's eye in the image and detects a Purkinje image and a pupil in the area including the user's eye. The gaze position detection unit 11 then detects a gaze position of the user on the basis of the positional relationship between the Purkinje image and the pupil center.

The gaze position detection unit 11 first detects an area including an eye. The luminance of each pixel corresponding to an eye is largely different from that of each pixel corresponding to an area around the eye. On the basis of this, the gaze position detection unit 11 performs difference operation on vertically neighboring pixels by the use of, for example, a Sobel filter, for the pixels in the image and thereby detects edge pixels at each of which the luminance changes in a vertical direction. The gaze position detection unit 11 determines, as an area including an eye, for example, an area surrounded by two edge lines each formed by substantially horizontally linking a predetermined number or more edge pixels corresponding to the size of an eye.

Alternatively, the gaze position detection unit 11 may carry out template matching between each template representing a figure of an eye in an image and an image, detect an area in the image having the best match with the template, and thereby determine the detected area as an area of an eye.

The gaze position detection unit 11 also detects an area including a pupil in the eye area. In this embodiment, the gaze position detection unit 11 carries out template matching between a template corresponding to a pupil and the eye area and detects an area having the highest match with the template in the eye area. When the highest matching value is higher than a predetermined matching threshold value, the gaze position detection unit 11 then determines that the detected area includes a pupil. Multiple templates corresponding to different pupil sizes may be prepared. In this case, the gaze position detection unit 11 carries out template matching between each template and the eye area and obtains the highest matching value. When the highest matching value is higher than a matching threshold value, the gaze position detection unit 11 determines that the area matching with the template corresponding to the highest matching value includes a pupil. The matching value is calculated, for example, as a normalized cross-correlation value between a template and the area overlapping with the template. The matching threshold value is set, for example, at 0.7 or 0.8.

The luminance of the area including a pupil is lower than the luminance of an area around the pupil area, and the pupil has a substantially circular shape. On the basis of these, the gaze position detection unit 11 sets two concentric rings having different radii in the eye area. When the difference value obtained by subtracting the average value of luminances of the pixels in the inner ring from the average value of the luminances of the pixels in the outer ring is larger than a predetermined threshold value, the gaze position detection unit 11 may determine the area surrounded by the inner ring as a pupil area. The gaze position detection unit 11 may add, to the condition for detecting an area as a pupil area, that the average luminance value of the area surrounded by the inner ring is equal to or smaller than a predetermined threshold value. In this case, the predetermined threshold value is set at, for example, a value obtained by adding the value corresponding to 10 to 20 percent of the difference between the largest luminance value and the smallest luminance value in the eye area to the smallest luminance value.

The gaze position detection unit 11 calculates the average value of the horizontal-coordinate values and the average value of the vertical-coordinate values of the pixels included in the pupil area, as the coordinates of the center of the pupil area.

The gaze position detection unit 11 detects a Purkinje image of the infrared-emitting diode included in the gaze detection device 4, in the eye area. The luminance of the area including a Purkinje image is higher than the luminance of an area around the area of the Purkinje image, and the luminance value is substantially saturated (i.e., the luminance value is approximately the maximum possible value of the luminance of a pixel). The shape of the Purkinje image area substantially matches the shape of the emitting surface of the infrared-emitting diode of the gaze detection device 4. On the basis of these, the gaze position detection unit 11 sets two rings that have shapes substantially matching the outline of the emitting surface of the infrared-emitting diode and have different sizes while having the same center, in the eye area. The gaze position detection unit 11 then obtains the difference value by subtracting the average value of the luminances of the pixels in the outer ring from the inner-luminance average value, which is the average value of the luminances of the pixels in the inner ring. When the difference value is larger than a predetermined difference threshold value and the inner-luminance average value is larger than a predetermined luminance threshold value, the gaze position detection unit 11 determines the area surrounded by the inner ring as a Purkinje image. The difference threshold value may be set, for example, at the average value of the values of the differences between neighboring pixels in the eye area. The predetermined luminance threshold value may be set, for example, at the value corresponding to 80 percent of the highest luminance value in the eye area.

The gaze position detection unit 11 may detect the pupil area by using any of various other methods of detecting a pupil area in an image. Similarly, the gaze position detection unit 11 may detect an area including a Purkinje image of the infrared-emitting diode of the gaze detection device 4 by using any of various other methods of detecting a Purkinje image area in an image.

Upon detection of the pupil center and the center of the Purkinje image, the gaze position detection unit 11 detects a user's gaze direction on the basis of the pupil center and the corneal reflection center.

Since the surface of a cornea has a substantially spherical shape, the positions of Purkinje images of a light source included in the gaze detection device 4 are nearly the same irrespective of gaze direction. In contrast, the pupil center moves according to user's gaze direction. On the basis of these, the gaze position detection unit 11 can detect a user's gaze direction by obtaining the relative position of the pupil center with respect to the center of the Purkinje image.

In this embodiment, the gaze position detection unit 11 obtains the relative position of the pupil center with respect to the center of the Purkinje image, for example, by subtracting the horizontal coordinate and the vertical coordinate of the center of the Purkinje image respectively from the horizontal coordinate and the vertical coordinate of the pupil center. The gaze position detection unit 11 then determines the user's gaze direction by referring to the reference table representing the relationship between a relative position of a pupil center and a user's gaze direction.

Upon detection of a user's gaze direction, the gaze position detection unit 11 detects a user's gaze position on the operation screen of the user interface unit 2 on the basis of the user's gaze direction and the estimated positional relationship between a user's eye and the user interface unit 2.

In this embodiment, the gaze position detection unit 11 obtains the measurement point of the user's gaze position with reference to the reference table representing the relationship between a user's gaze direction and a user's gaze position, in the estimated positional relationship between a user's eye and the user interface unit 2. The gaze position detection unit 11 then stores the coordinates of the measurement point of the user's gaze position on the operation screen in the memory 5 together with the acquisition order. The acquisition order of the measurement point of the gaze position may be expressed by a number indicating the order or may be expressed by the time when the image of the user's eye used for obtaining the measurement point was acquired. The measurement point of the gaze position obtained by the gaze position detection unit 11 corresponds to raw measurement data of the gaze position before calibration.

The move pattern detection unit 12 detects a move pattern of user's gaze positions on the basis of a series of gaze position measurement points obtained by the gaze position detection unit 11.

On the operation screen of the user interface unit 2 in the terminal 1, relatively small partial areas, such as various icons or operation buttons according to the use of the terminal 1, are displayed according to predetermined arrangement (e.g., two-dimensional array). Each of the partial areas displays relatively short text indicating an operation corresponding to the partial area or data to be input. For this reason, for each partial area, for example, the user can read the text displayed in each partial area with a small number of fixation points. The user normally does not need to look at all the partial areas and may look at the partial areas in any order.

Figure 4:
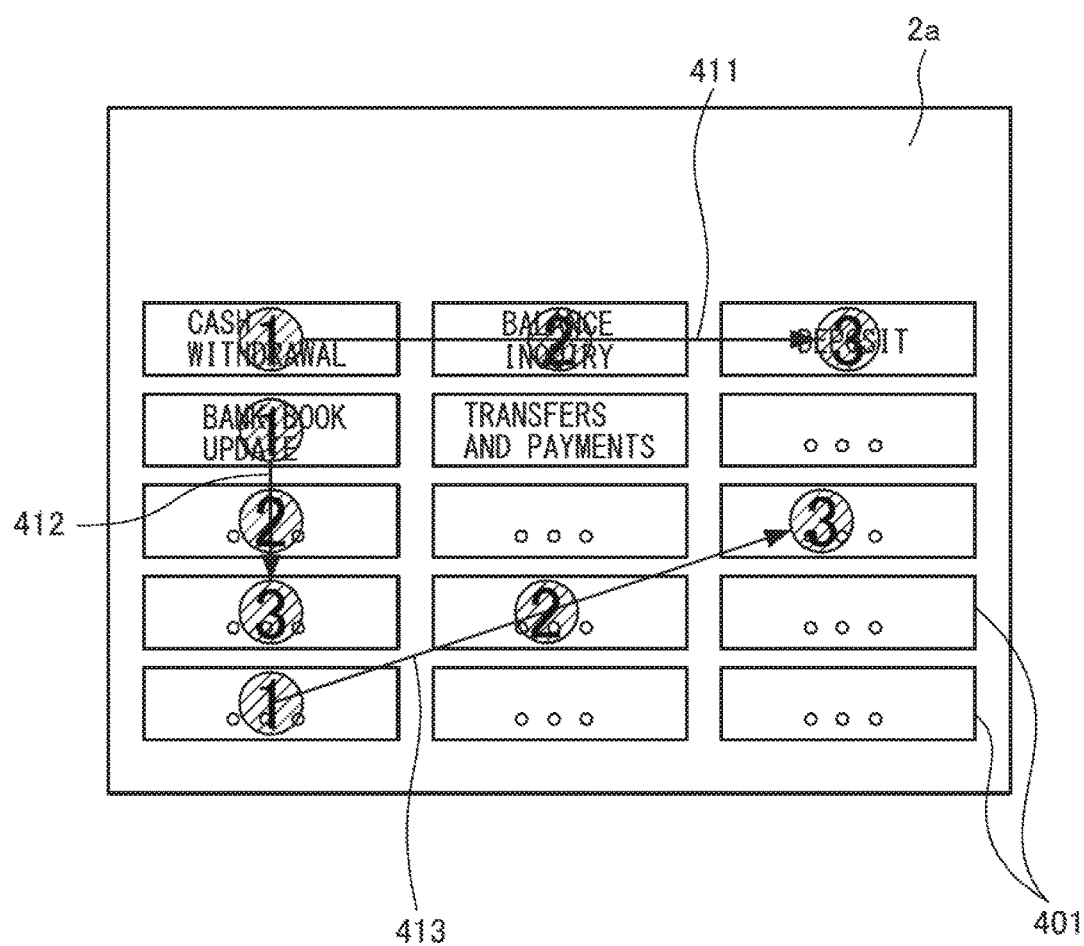
FIG. 4 is a diagram illustrating an example of an operation screen of the user interface unit.

The above described situation is explained with reference to FIG. 4. FIG. 4 is a diagram illustrating an example of the operation screen of the user interface unit 2. In this example, multiple icons 401 are displayed in two-dimensional arrays on the operation screen 2a. In each of the icons 401, text representing an operation to be performed upon pressing of the icon is displayed. In this case, a user looks at some icons in the order indicated by a move pattern 411 represented by an arrow, for example. Another user looks at some icons in the order indicated by a move pattern 412 represented by an arrow, for example. A still another user looks at some icons in the order indicated by a move pattern 413 represented by an arrow, for example. Thus, various gaze position move patterns by different users are possible. In addition, the number of variations in move pattern increases by investigating gaze position move patterns in a longer period.

Every time a predetermined time period elapsed after one or more fixation points are detected from multiple measurement points of user's gaze positions, the move pattern detection unit 12 detects the series of fixation points obtained in the predetermined time period, as a move pattern. The move pattern detection unit 12 sets, as the predetermined time period, a fixed period (e.g., two seconds) ending with the time when the latest measurement point of the gaze position is detected, for example. Alternatively, the move pattern detection unit 12 may determine that the predetermined time period ended every time a series of a predetermined number (e.g., five) latest fixation points has been acquired. Alternatively, the move pattern detection unit 12 may determine that the predetermined time period ended when the total of the move distances between a series of fixation points reached a predetermined distance threshold value. The predetermined distance threshold value may be set at a value corresponding to that obtained by multiplying the average of the distances between adjacent partial areas among the multiple partial areas displayed on the operation screen of the user interface unit 2 by a certain number (e.g., three), for example. Since information on the sizes and positions of the partial areas displayed on the operation screen of the user interface unit 2 is stored in advance in the memory 5, the move pattern detection unit 12 may set the distance threshold value by the use of the information.

The move pattern detection unit 12 may determine, as fixation, a set of two successive gaze position measurement points having a move amount equal to or smaller than a predetermined threshold value, and detect one of the measurement points or the average thereof as the position of a fixation point.

Every time a gaze position move pattern is detected, the move pattern detection unit 12 stores, in the memory 5, the coordinates of each of the fixation points included in the move pattern, detection order of the fixation points, and the measurement times of the fixation points.

The feature extraction unit 13 extracts features for selection to be used for selecting move patterns registered in the move pattern database that are to be candidates for a similar move pattern at the time of extracting a similar move pattern from the move pattern database.

When a user gaze direction is detected on the basis of the positional relationship between a Purkinje image and a pupil center, the distance between the Purkinje image and the pupil center changes according to various conditions such as eye size. For example, the distance between a Purkinje image and a pupil center in an image including an eye is longer, as the eye size is larger, even when gaze directions are the same. Similarly, the distance between a Purkinje image and a pupil center in an image including an eye is longer, as the distance between the infrared-emitting diode of the gaze detection device 4 and the camera is longer, even when gaze directions are the same. In addition, the position of a pupil center in an image changes according to the position or posture of the user's head with respect to the camera of the gaze detection device 4, even when gaze directions are the same.

In some cases, a Purkinje image is outside a pupil due to the pupil size. In such a case, since the difference in luminance between the Purkinje image and the iris is small, the accuracy in detection of a Purkinje image may decrease. When the user narrows his/her eyes, part of the pupils are hidden behind the eye lids, and the position of each pupil center may not be obtained accurately in some cases. When the accuracy in detecting a Purkinje image or a pupil center decreases as in the above cases, the control unit 6 fails to detect a user's gaze direction accurately.

In view of this, in order to accurately correct the position of each user's gaze point (fixation point in this example), it is preferable that the features of the user's eye and the environment at the time when a move pattern is detected match the features of the eye in a similar move pattern and the environment at the time when the similar move pattern is detected.

For the above reason, the feature extraction unit 13 extracts one or more of a user feature (first feature), which is a feature related to a user, a hardware feature (second feature), which relates to the arrangement of the gaze detection device 4 or the terminal 1, and an environment feature (third feature), which relates to the environment at the time of acquiring a move pattern. The user feature includes at least one of the pupil size, the head position, the head posture, or the moving speed of the gaze. The hardware feature includes at least one of the positional relationship between the gaze detection device 4 and the operation screen of the user interface unit 2, the positional relationship between the infrared-emitting diode and the camera of the gaze detection device 4, the angle of view of the camera, information representing contents displayed on the operation screen, or identification information of the terminal 1. The environment feature includes at least one of the illumination intensity at the time when the move pattern is detected, the time and date of the detection of the move pattern, or information representing the position at which the gaze detection device 4 is installed.

The pupil size is calculated on the basis of an image obtained by the camera of the gaze detection device 4. The user's head position and posture can be estimated on the basis of the user's head position and the direction that user's face is facing in an image obtained by the camera of the gaze detection device 4, for example.

The feature extraction unit 13 calculates a feature related to the user's eye and a feature representing the head posture among user features, from the image obtained by the camera of the gaze detection device 4.

For example, when a pupil is detected by template matching, the feature extraction unit 13 can determine, as the pupil size, the horizontal size or the vertical size of the pupil in the template having the best match with the pupil. Alternatively, in order to obtain the shape of the pupil more accurately, the feature extraction unit 13 sets, for example, multiple lines radially from the pupil center and detects, in each line, the edge at which the luminance value decreases on the side having the pupil center. The feature extraction unit 13 may then obtain the outline shape of the pupil by linking the detected edges by, for example, an outline extraction method using a dynamic outline model, such as Snake, and calculate, as the pupil size, the horizontal or vertical size of the shape on the basis of the outline shape of the pupil.

When part of a pupil is hidden by an eye lid, such as a case in which the user narrows his/her eyes, the feature extraction unit 13 may estimate the size of the pupil on the basis of user's feeling. In this case, in order to estimate user's feeling, the feature extraction unit 13 can, for example, employ a technique for detecting a facial expression of the user from an image including the user's face and thereby estimating user's feeling on the basis of the facial expression. The feature extraction unit 13 can use, as an image including the face of the user, an image obtained by the camera of the gaze detection device 4. When the terminal 1 includes a camera different from that of the gaze detection device 4, the feature extraction unit 13 may use an image obtained by the camera capturing an image of the user's face.

The feature extraction unit 13 detects a head area from an image by the use of a discriminator that has studied in advance so as to detect a head area including a user's head from an image, in order to detect the position and posture of the user's head. In this case, for example, AdaBoost, Real AdaBoost, a support vector machine, or a deep neural network can be used as the discriminator. The feature extraction unit 13 sets a window on an image, inputs, to the discriminator, the value of each pixel in the window or each feature extracted from the window while changing the position of the window, and thereby determines whether or not the window corresponds to a head area. As the feature, a Haar-like feature or a histograms-of-oriented-gradients feature may be extracted, for example. The feature extraction unit 13 obtains the center of the head area and calculates the angle of the direction from the camera to the head of the user with respect to the optical axis of the camera on the basis of the position of the center in the image and the angle of view of the camera. The feature extraction unit 13 detects the line linking the midpoint of the inner corners of both eyes and the midpoint of the lips as a median line and can identify the direction that the user's face is facing, on the basis of the positional relationship of the point of a nose tip with respect to the median line. For this operation, the feature extraction unit 13 may use, for example, a discriminator that has studied to detect lips and a discriminator that has studied to detect the point of a nose tip, in order to detect lips and the point of a nose tip in an image. The feature extraction unit 13 may detect corners of eyes by template matching or by the use of a corner detection filter. Alternatively, the feature extraction unit 13 may use any other technique for detecting corners of eyes, lips, and the point of a nose tip in an image.

The feature extraction unit 13 may calculate the distance between the corners of both eyes in the image, estimate the distance from the gaze detection device 4 to the user's head, and set the distance as one factor of the user feature. In this case, the feature extraction unit 13 may obtain the distance from the gaze detection device 4 to the user's head corresponding to the distance between the corners of both eyes with reference to a reference table representing the relationship between the distance between the corners of both eyes and the distance from the gaze detection device 4 to the user's head. When the terminal 1 includes a camera different from that of the gaze detection device 4, the feature extraction unit 13 may detect a feature point of the user's face from each of an image obtained by the camera and an image obtained by the gaze detection device 4. The feature extraction unit 13 may calculate the distance to the user's head on the basis of the feature points according to the principle of triangulation.

The feature extraction unit 13 may calculate, as one factor of the user feature, the average speed of gaze move on the basis of the measurement times of the fixation points included in the move pattern and the differences in position between the fixation points.

The feature extraction unit 13 acquires, as one factor of the environment feature, time information such as the time and date of detection of the move pattern, from a clock (not illustrated) included in the terminal 1 or a different device connected to the terminal 1 via the communication network. In addition, when the terminal 1 includes an illumination intensity sensor (not illustrated), the measurement value of the illumination intensity obtained by the illumination intensity sensor may be used as the illumination intensity of an area around the terminal 1, as a different factor of environment feature. When the terminal 1 includes a camera different from that of the gaze detection device 4, the feature extraction unit 13 may calculate, as the illumination intensity of an area around the terminal 1, the average value of the luminance values of the pixels in the area estimated to include a static object in an image obtained by the camera. Further, the feature extraction unit 13 reads, from the storage device 7, information indicating the position at which the terminal 1 is installed, for example, information indicating the latitude and the altitude of the position at which the terminal 1 is installed or whether the position is inside or outside.

In addition, the feature extraction unit 13 reads a hardware feature from the storage device 7.

The feature extraction unit 13 does not need to extract all the above features for selection and may extract at least one of the features for selection.

The feature extraction unit 13 passes the obtained features for selection to the similar-pattern extraction unit 14.

The similar-pattern extraction unit 14 extracts a similar move pattern, which is a move pattern most similar to the detected move pattern of the user (referred to as a current move pattern below), from the gaze position move pattern database. In this extraction, the similar-pattern extraction unit 14 selects move patterns as candidates for a similar move pattern on the basis of the features received from the feature extraction unit 13 and extracts a similar move pattern from among the selected move patterns.

FIG. 5 is a diagram illustrating an example of the move pattern database. In a move pattern database 500, instances of user identification information 501, move pattern sequence numbers 502, coordinates 503 of gaze points each detected as a fixation point in a corresponding move pattern, a correction vector 504 of each gaze point, features for selection 505, and calibration maps 506 are registered. In the following description, each user registered in the move pattern database is referred to as a registered user, for illustration purposes. In addition, each move pattern registered in the move pattern database is referred to as a registered move pattern.

Each correction vector 504 is an example of correction information and is a vector starting from the position of a detected fixation point toward an estimated position of an actual fixation point of a corresponding registered user. As described above, the features for selection 505 include at least one of the user feature such as the pupil size or the head position, the hardware feature such as the positional relationship between the gaze detection device 4 and the operation screen of the user interface unit 2 or the angle of view of the camera, and an environment feature such as the illumination intensity at the time when the move pattern is detected, and the time and date of the detection of the move pattern. Each calibration map 506 includes, for each of multiple sampling points not included in any of the registered move patterns registered in relation to a corresponding registered user, the position of the sampling point and the correction vector for the sampling point. In addition to these, the calibration map 506 may include features for selection (e.g., head posture) corresponding to the registered move pattern used for calculating the correction vector of each sampling point, and the latest update time.

For example, the similar-pattern extraction unit 14 selects registered move patterns each having the same hardware feature as a hardware feature extracted for the current move pattern, from among the registered move patterns registered in the move pattern database. For example, the similar-pattern extraction unit 14 selects a registered move pattern obtained by the use of a different gaze detection device in which a light source and a camera are arranged to have a certain distance therebetween, the certain distance being the same as that between the infrared-emitting diode and the camera of the gaze detection device 4 of the terminal 1. The similar-pattern extraction unit 14 may select a registered move pattern obtained by the use of a different gaze detection device having a camera with the same angle of view as that of the camera of the gaze detection device 4. The similar-pattern extraction unit 14 may select a registered move pattern obtained by the use of a different device in which a user interface unit and a gaze detection device are arranged to have the same positional relationship as that of the user interface unit 2 and the gaze detection device 4 of the terminal 1. The similar-pattern extraction unit 14 may select a registered move pattern obtained by the terminal 1 itself. Further, the similar-pattern extraction unit 14 may select a registered move pattern of the time when the same contents as those displayed on the operation screen of the user interface unit 2 at the time of detection of the current move pattern are displayed by the user interface unit 2.

It is preferable that, when multiple hardware features are obtained for the current move pattern, the similar-pattern extraction unit 14 select registered move patterns each having hardware features matching all the obtained hardware features. With this configuration, the similar-pattern extraction unit 14 can suppress selecting a registered move pattern having a positional relationship different from that between a Purkinje image and a pupil center at the time of acquiring the current move pattern due to the difference in arrangement of the gaze detection device 4, for example.

The similar-pattern extraction unit 14 further selects, from among the selected registered move patterns, registered move patterns each having an environment feature different from that of the current move pattern within a predetermined allowable range. For example, the similar-pattern extraction unit 14 selects a registered move pattern obtained when the illumination intensity is different from that in an area around the terminal 1 at the time of acquiring the current move pattern within a predetermined allowable range. Alternatively, the similar-pattern extraction unit 14 may determine whether the current move pattern is acquired during the daytime or in the night, on the basis of the time and date at the time of acquiring the current move pattern and the latitude of the position at which the terminal 1 is installed. When the current move pattern is acquired during the daytime, the similar-pattern extraction unit 14 selects a registered move pattern acquired during the daytime by the terminal 1 or a different terminal. In contrast, when the current move pattern is acquired in the night, the similar-pattern extraction unit 14 selects a registered move pattern acquired in the night by the terminal 1 or a different terminal.

The similar-pattern extraction unit 14 further selects, from among the selected registered move patterns, registered move patterns each having a user feature different from that of the current move pattern within a predetermined allowable range. For example, the similar-pattern extraction unit 14 selects a registered move pattern for which each of the angle of the direction from the gaze detection device 4 to the head and the direction that the face is facing is different from that of the current pattern within five degrees.

Alternatively, the similar-pattern extraction unit 14 may select a registered move pattern having a pupil size different from that of the user at the time of acquiring the current move pattern within a predetermined allowable range. The similar-pattern extraction unit 14 may select a registered move pattern acquired at a distance different from that from the gaze detection device 4 to the user's head at the time of acquiring the current move pattern within a predetermined allowable range. Further, the similar-pattern extraction unit 14 may select a registered move pattern having the average speed of gaze different from that of the current move pattern within a predetermined allowable range (e.g., 50 degrees/second).

It is preferable that, when multiple environment features are obtained for the current move pattern, the similar-pattern extraction unit 14 select, for each of the environment features, registered move patterns each having environment features each within the allowable range of the environment feature. Similarly, it is preferable that, when multiple user features are obtained for the current move pattern, the similar-pattern extraction unit 14 select, for each of the user features, registered move patterns each having user features each within the allowable range of the user feature. With this configuration, the similar-pattern extraction unit 14 can reduce the number of registered move patterns to be candidates for a similar move pattern, consequently reducing the computation amount.

The similar-pattern extraction unit 14 extracts a similar move pattern from among the selected registered move patterns. For the extraction, the similar-pattern extraction unit 14 calculates, as an evaluation value, the sum of squares of the respective distances each between the fixation points of each selected registered move pattern and the current pattern. In the calculation, the similar-pattern detection unit 14 may calculate an evaluation value only for each registered move pattern including the same number of fixation points as that of the current move pattern. Alternatively, the similar-pattern detection unit 14 may calculate the sum of squares of the respective distances each between the fixation points having the same position in the orders of the current move pattern and the registered move pattern. The similar-pattern extraction unit 14 then determines the registered move pattern having the smallest evaluation value as a similar move pattern.

According to a modified example, the similar-pattern extraction unit 14 may calculate, as an evaluation value, the sum of absolute values of the respective distances each between corresponding fixation points, instead of the sum of squares of the distances each between corresponding fixation points.

In some cases, similar move patterns obtained for each of a predetermined number (e.g., 3 to 5) of move patterns detected immediately before the current move pattern may be of the same registered user. In such a case, the similar-pattern extraction unit 14 obtains the smallest value of the evaluation values of the registered move patterns of the registered user corresponding to the similar move patterns obtained for the predetermined number of move patterns obtained immediately before the current move pattern. When the difference between the smallest evaluation value for the registered user and the smallest value of the evaluation values calculated for all the registered move patterns is within a predetermined allowable difference, the similar-pattern extraction unit 14 may determine the registered move pattern corresponding to the smallest evaluation value of the registered user as a similar move pattern. With this configuration, the similar-pattern extraction unit 14 can preferentially determine a registered move pattern of a registered user having a similar manner of changing gaze positions as that of the user, as a similar move pattern.

Hence, the similar-pattern extraction unit 14 can select a similar move pattern associated with correction information assumed to be more appropriate as correction information for the gaze position of the user.

The similar-pattern extraction unit 14 passes the similar move pattern to the correction unit 15.

The correction unit 15 corrects the position of each fixation point included in the current move pattern, on the basis of the similar move pattern. For example, the correction unit 15 selects, for a target fixation point included in the current pattern, a fixation point closest to the target fixation point from among the fixation points included in the similar move pattern and uses the correction vector corresponding to the selected fixation point as the correction vector for the target fixation point. In some cases, a sampling point included in the calibration map of the registered user corresponding to the similar move pattern may be closer to the target fixation point than any of the fixation points included in the similar move pattern is. In such a case, the correction unit 15 may use the correction vector for the sampling point as the correction vector for the target fixation point. It is preferable that the correction unit 15 use the correction vector for a sampling point having features for selection each being the same as that of the current move pattern or different from that of the current move pattern within a predetermined allowable range. With this configuration, the correction unit 15 can use a more appropriate correction vector. In addition, the correction unit 15 may select multiple fixation points from among the fixation points included in the similar move pattern from the one closest to the target fixation point. The correction unit 15 may calculate a correction vector for the target fixation point by carrying out an interpolation process for the correction vectors of the selected fixation points.

The correction unit 15 estimates, as a real fixation point of the user, the position obtained by shifting each fixation point included in the current move pattern by the correction vector obtained for the fixation point. The control unit 6 carries out a process corresponding to the estimated fixation point of the user in relation to the current move pattern. For example, when the fixation point of the user is positioned at a particular icon for a certain time period or longer, the control unit 6 may display a pop-up window presenting description of the icon, on the operation screen of the user interface unit 2.

When the user performs a certain operation on the user interface unit 2, such as pressing of any of the icons displayed on the operation screen of the user interface unit 2, the operation-based correction unit 16 corrects a gaze position by the use of the operation. For example, it is assumed that, when the user performs a certain operation on the user interface unit 2, the user gazes the position on the operation screen to perform the operation (e.g., the position of the icon to press). For this reason, the operation-based correction unit 16 calculates, as a correction vector, the vector from the measurement point of the gaze position of the user immediately before the user performs the certain operation on the user interface unit 2 to the position at which the operation is performed. The position at which the operation is performed is, for example, a pressed position or the position of the center of the icon including a pressed position.

After the completion of a series of operations by the user, the registration unit 17 registers, in the move pattern database, data on each move pattern (e.g., the positions of fixation points, correction vectors, and features for selection) acquired in the period from the first detection of a move pattern of the user to the completion of the operations. For the registration, the registration unit 17 can use, for example, identification information (e.g., account number) input during the execution of the series of operations, as user identification information. The registration unit 17 may determine that the user has completed the series of operations when the user performs an operation corresponding to the completion of the series of operations via the user interface unit 2. Alternatively, the registration unit 17 may determine that the user has completed the series of operations when neither any of the pupils of the user nor a Purkinje image have detected for a certain time period (e.g., 30 seconds to one minute).

When the user is different from any of the registered users, the registration unit 17 may generate a calibration map on the basis of the move patterns obtained in the period from the first detection of a move pattern of the user to the completion of the operations. In this process, the registration unit 17 sets sampling points so that the intervals between the sampling points are to be shorter than those between adjacent icons, for example. The registration unit 17 selects, for each of the sampling points, multiple fixation points included in any of the move patterns, in order from the one closest to the sampling point, carries out an interpolation process on the basis of the positions of the selected fixation points and the correction vectors, and thereby calculates a correction vector for the sampling point.

When the user is one of the registered users, the registration unit 17 may update the corresponding calibration map on the basis of the move patterns obtained in the period from the first detection of a move pattern of the user to the completion of the operations and the registered move patterns. In this case, as the above, the registration unit 17 may calculate a correction vector for each sampling point by carrying out a process similar to the above-described process. The registration unit 17 may narrow the intervals between adjacent sampling points when the number of move patterns obtained for the user is larger.

Moreover, the registration unit 17 may divide the operation screen of the user interface unit 2 into a predetermined number of blocks, and generate or update a calibration map when a predetermined number (e.g. 3 to 5) or more fixation points are included in each of the blocks.

Figure 6:
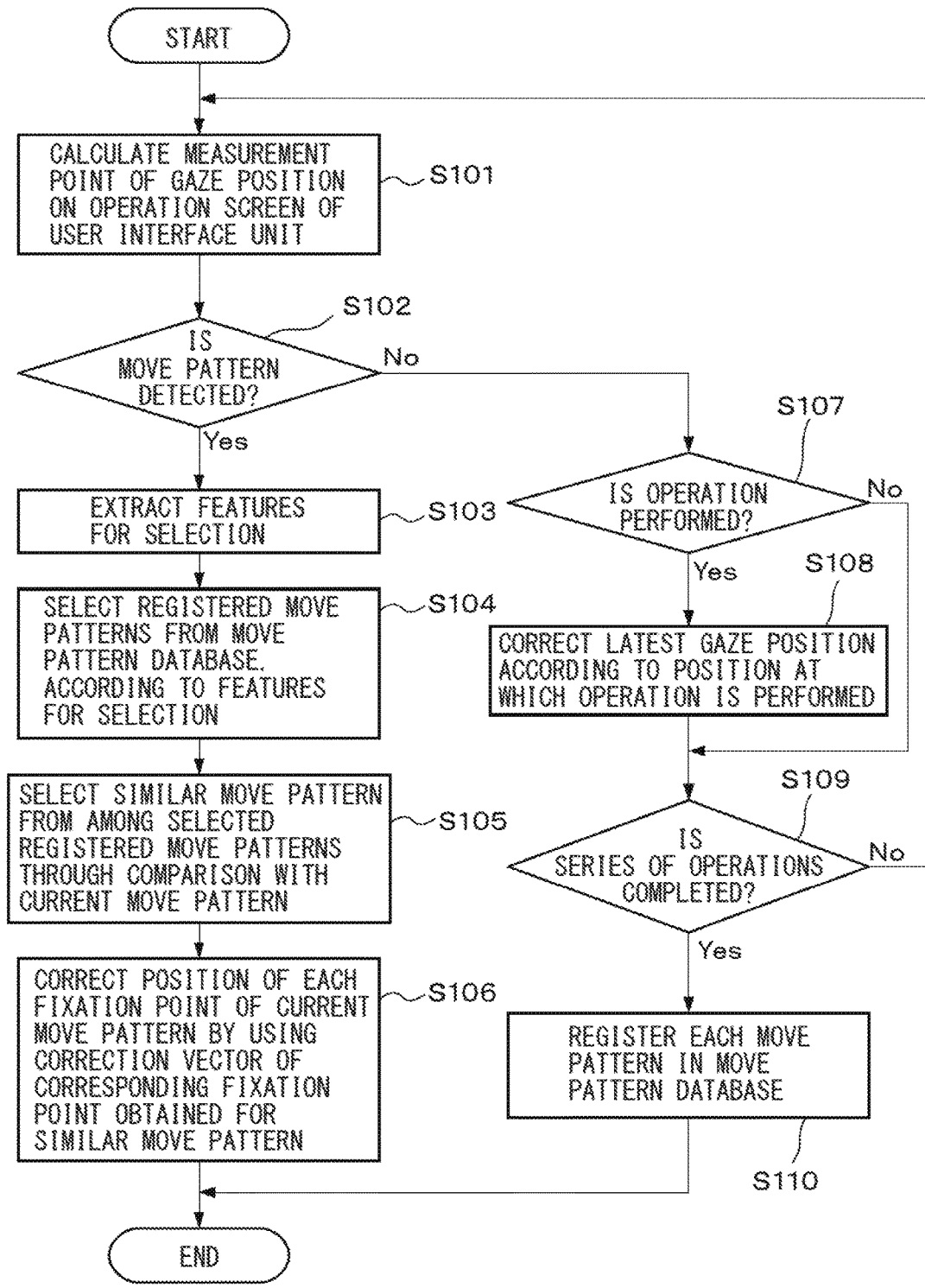
FIG. 6 is an operation flowchart of the gaze position detection process.

FIG. 6 is an operation flowchart of a gaze position detection process carried out by the control unit 6. Every time an image including an eye of a user is received from the gaze detection device 4, the control unit 6 carries out the gaze position detection process in accordance with the following operation flowchart.

The gaze position detection unit 11 obtains the measurement point of the gaze position on the operation screen of the user interface unit 2 from the image including the eye of the user acquired from the gaze detection device 4 (Step S101). The gaze position detection unit 11 then stores the coordinates of the measurement point on the operation screen and the acquisition order, in the memory 5.

The move pattern detection unit 12 determines, on the basis of the measurement points of the multiple gaze positions up to the measurement point of the latest gaze position, whether a move pattern of the gaze positions is detected (Step S102). When a move pattern (i.e., a current move pattern) is detected (Yes in Step S102), the feature extraction unit 13 extracts features for selection (Step S103). The similar-pattern extraction unit 14 selects registered move patterns to be candidates for a similar move pattern from among the registered move patterns registered in the move pattern database, on the basis of the features for selection (Step S104). The similar-pattern extraction unit 14 selects a similar move pattern from among the selected registered move patterns by comparing each of the selected registered move patterns with the current move pattern (Step S105).

The correction unit 15 corrects the positions of the fixation points included in the current move pattern on the basis of the correction vectors of the fixation points included in the similar move pattern (Step S106).

In contrast, when no move pattern is detected in Step S102 (No in Step S102), the control unit 6 determines whether any operation by the user via the user interface unit 2 is performed (Step S107). When an operation by the user via the user interface unit 2 is performed (Yes in Step S107), the operation-based correction unit 16 corrects the position of the latest gaze point on the basis of the position on the operation screen at which the operation by the user is performed (Step S108).

After Step S108, or when no operation by the user via the user interface unit 2 is performed (No in Step S107), the control unit 6 determines whether a series of operations by the user is completed (Step S109). When a series of operations by the user is not completed (No in Step S109), the control unit 6 repeats the operations in S101 and thereafter.

In contrast, when a series of operations by the user is completed (Yes in Step S109), the registration unit 17 registers, in the move pattern database, the respective move patterns detected in the period from the detection start of a move pattern to the completion of the series of operations by the user (Step S110).

After Step S106 or Step S110, the control unit 6 terminates the gaze position detection process.

As described above, the gaze position detection apparatus corrects gaze positions of a user by the use of correction information that is defined for a similar move pattern registered in the move pattern database and that is similar to a detected move pattern of gaze positions of a user. For this reason, the gaze position detection apparatus can correct the gaze positions of the user even before the user performs any operation or even when the user does not perform any operation. Hence, the gaze position detection apparatus can provide in real time appropriate guidance corresponding to the position at which the user is gazing, even before the user performs an operation, for example. In addition, by acquiring a larger number of move patterns of the user, the gaze position detection apparatus can provide a more accurate calibration map with respect to the user. Moreover, by acquiring move patterns of a larger number of users, the gaze position detection apparatus can increase the number of move patterns stored in the move pattern database.

Figure 7:
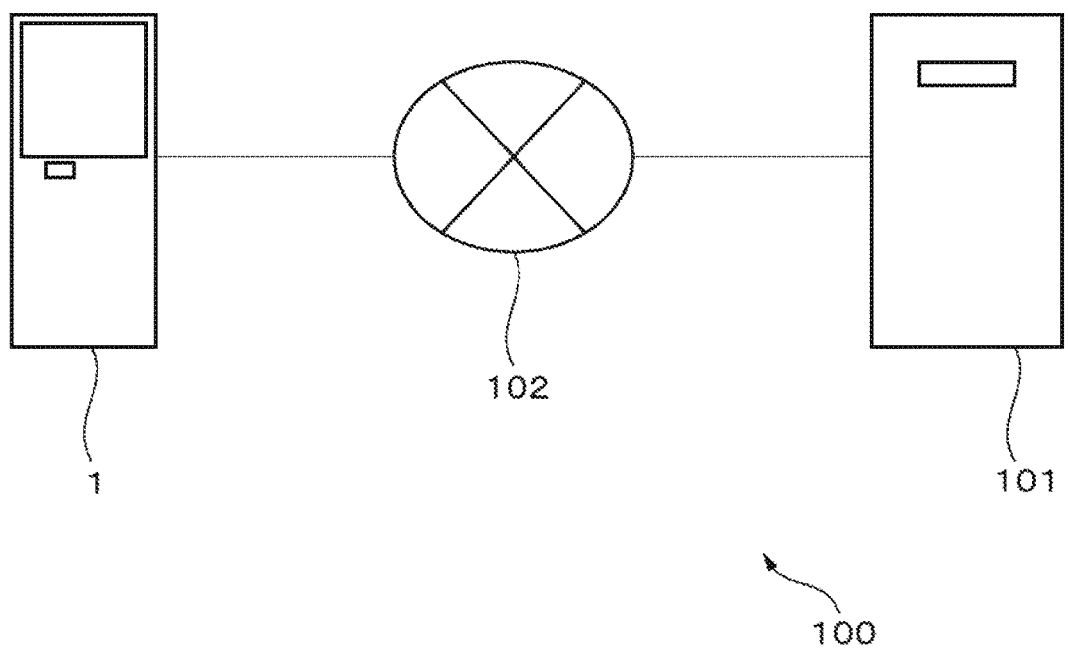
FIG. 7 is a schematic configuration diagram of a gaze position detection system.

FIG. 7 is a schematic configuration diagram of a gaze position detection system including the terminal 1 according to the above-described embodiment or modified example. A gaze position detection system 100 includes the terminal 1 and a server 101 connected via the communication network 102. The gaze position detection system 100 may include the server 101 or multiple servers 101. A move pattern database is stored in a storage device (not illustrated) of the server 101. In this example, one or more processors included in the server 101 may carry out the processes of the similar-pattern extraction unit 14 and the registration unit 17. In this case, the control unit 6 of the terminal 1 transmits an extraction request signal to extract a similar move pattern including information indicating a detected move pattern and features for selection, to the server 101 via the communication interface unit 3 and the communication network 102. Upon receipt of the extraction request signal, the server 101 carries out the process of the similar-pattern extraction unit 14 to extract a similar move pattern from the move pattern database. The server 101 then generates a response signal including information indicating the extracted similar move pattern and transmits the response signal to the terminal 1 via the communication network 102. In the terminal 1, the control unit 6 receives the response signal via the communication interface unit 3 and carries out the subsequent process with reference to the information indicating the similar move pattern included in the response signal, to correct the gaze positions of the user. In addition, upon determination that a series of operations by the user is completed, the control unit 6 of the terminal 1 generates a registration request signal including the move patterns acquired for the user and features for selection. Then, the control unit 6 transmits the registration request signal to the server 101 via the communication interface unit 3 and the communication network 102. Upon receipt of the registration request signal, the server 101 carries out the process by the registration unit 17 to register the move pattern of the user in the move pattern database.

According to another modified example, the similar-pattern extraction unit 14 may change the order of the processes for selecting move patterns to be candidates for a similar move pattern, to the order according to the above-described embodiment. When no features for selection are obtained, the similar-pattern extraction unit 14 may calculate an evaluation value for each of all the registered move patterns registered in the move pattern database and select the registered move pattern having the smallest evaluation value, as a similar move pattern.

Further, each move pattern may include measurement points of gaze points other than fixation points. In this case, measurement points of the gaze points and corresponding correction vectors for each registered move pattern registered in the move pattern database may also be included.

A computer program implementing the functions of the control unit according to the above-described embodiment and modified examples may be provided in the form of being recorded in a computer-readable recording medium, such as a semiconductor memory, a magnetic recording medium, or an optical recording medium.

All examples and conditional language recited herein are intended to have teaching purpose to aid the reader in understanding the concepts contributed by the inventor to the present invention and furthering the art, and are to be construed as being without limitation to such specifically recited examples and conditions nor does the organization of such examples in the specification related to showing of the superiority and inferiority of the invention. Although the embodiment of the present invention is described in detail, it is to be understood that various changes, substitutions, and modifications can be made hereto without departing from the spirit and scope of the invention.

What is claimed is:

1. A gaze position detection apparatus comprising:
   a memory configured to store a plurality of registered move patterns of a gaze position and correction information of the gaze position included in the registered move pattern for each of the plurality of registered move patterns; and
   a processor configured to:
   detect a move pattern of a user's gaze position, from a plurality of measurement points of the user's gaze position which are obtained from data items representing a user's gaze direction generated by a gaze detection device in different timing;
   extract at least one feature among a first feature related to the user, a second feature related to an arrangement of the gaze detection device, and a third feature related to the environment at the time when the move pattern is detected;
   extract the registered move pattern similar to the move pattern from among the plurality of registered move patterns; and
   correct the gaze position included in the move pattern using the correction information of the gaze position for the similar registered move pattern, wherein the memory stores the at least one feature among the first feature, the second feature, and the third feature, for each of the plurality of registered move patterns, and
   the processor selects, among the plurality of registered move patterns, one or more registered move patterns, a difference between the at least one feature for the move pattern and the at least one feature for the registered move pattern being within a predetermined allowable range, and extracts the similar registered move pattern among from the selected registered move patterns.

2. The gaze position detection apparatus according to claim 1, wherein the first feature includes at least one of pupil size, head posture, or moving speed of the gaze.

3. The gaze position detection apparatus according to claim 1, wherein the gaze detection device includes a light source and a camera, and the second feature includes at least one of positional relationship between the gaze detection device and a target surface at which the user is to gaze, positional relationship between the light source and the camera, an angle of view of the camera, information representing contents displayed on the surface, and identification information of an apparatus including the surface.

4. The gaze position detection apparatus according to claim 1, wherein the third feature includes at least one of illumination intensity at the time when the move pattern is detected, time and date of the detection of the move pattern, and information representing an installation position at which the gaze detection device is installed.

5. The gaze position detection apparatus according to claim 1, wherein every time a predetermined time period elapsed after one or more fixation points are detected from a plurality of measurement points of user's gaze positions, the processor sets a series of fixation points obtained in the predetermined time period as the move pattern.

6. The gaze position detection apparatus according to claim 5, wherein the processor determines that the predetermined time period elapsed every time a predetermined number of fixation points are detected.

7. The gaze position detection apparatus according to claim 5, wherein a plurality of partial areas are displayed on the target surface at which the user is to gaze, and the processor determines that the predetermined time period elapsed when a total of move distances between the one or more fixation points reaches or exceeds a value obtained by multiplying an average of distances between adjacent partial areas among the plurality of partial areas by a certain number.

8. A gaze position detection method including:
   detecting a move pattern of a user's gaze position, from a plurality of measurement points of the user's gaze position which are obtained from data items representing a user's gaze direction generated by a gaze detection device in different timing;
   extracting at least one feature among a first feature related to the user, a second feature related to an arrangement of the gaze detection device, and a third feature related to the environment at the time when the move pattern is detected;

extracting the registered move pattern similar to the move pattern from among the plurality of registered move patterns of a gaze position stored in a storage unit; and correcting the gaze position included in the move pattern using correction information of the gaze position corresponding to the similar registered move pattern; wherein extraction of the registered move pattern includes selecting, among the plurality of registered move patterns, one or more registered move patterns, a difference between the at least one feature for the move pattern and the at least one feature for the registered move pattern being within a predetermined allowable range, and extracting the similar registered move pattern among from the selected registered move patterns.

9. The gaze position detection method according to claim 8, wherein the first feature includes at least one of pupil size, head posture, or moving speed of the gaze.

10. The gaze position detection method according to claim 8, wherein the gaze detection device includes a light source and a camera, and the second feature includes at least one of positional relationship between the gaze detection device and a target surface at which the user is to gaze, positional relationship between the light source and the camera, an angle of view of the camera, information representing contents displayed on the surface, and identification information of an apparatus including the surface.

11. The gaze position detection method according to claim 8, wherein the third feature includes at least one of illumination intensity at the time when the move pattern is detected, time and date of the detection of the move pattern, and information representing an installation position at which the gaze detection device is installed.

12. The gaze position detection method according to claim 8, wherein detection of the move pattern of the user's gaze position includes, every time a predetermined time period elapsed after one or more fixation points are detected from a plurality of measurement points of user's gaze positions, setting a series of fixation points obtained in the predetermined time period as the move pattern.

13. The gaze position detection method according to claim 12, further comprising:

determining that the predetermined time period elapsed every time a predetermined number of fixation points are detected.

14. The gaze position detection method according to claim 12, wherein a plurality of partial areas are displayed on the target surface at which the user is to gaze, and further comprising:

determining that the predetermined time period elapsed when a total of move distances between the one or more fixation points reaches or exceeds a value obtained by multiplying an average of distances between adjacent partial areas among the plurality of partial areas by a certain number.

15. A non-transitory computer-readable recording medium having recorded thereon a computer program for detecting a gaze position that causes a computer to execute a process comprising:

detecting a move pattern of a user's gaze position, from a plurality of measurement points of the user's gaze position which are obtained from data items representing a user's gaze direction generated by a gaze detection device in different timing;

extracting at least one feature among a first feature related to the user, a second feature related to an arrangement of the gaze detection device, and a third feature related to the environment at the time when the move pattern is detected;

extracting the registered move pattern similar to the move pattern from among the plurality of registered move patterns of a gaze position stored in a storage unit; and correcting the gaze position included in the move pattern using correction information of the gaze position corresponding to the similar registered move pattern; wherein extraction of the registered move pattern includes selecting, among the plurality of registered move patterns, one or more registered move patterns, a difference between the at least one feature for the move pattern and the at least one feature for the registered move pattern being within a predetermined allowable range, and extracting the similar registered move pattern among from the selected registered move patterns.

\* \* \* \* \*